(12) United States Patent
Scherrenbacher et al.

(10) Patent No.: US 10,778,138 B2
(45) Date of Patent: Sep. 15, 2020

(54) DRILLING DEVICE AND METHOD FOR OPERATING A DRILLING DEVICE

(71) Applicant: C. & E. Fein GmbH, Schwaebisch Gmuend-Bargau (DE)

(72) Inventors: Stefan Scherrenbacher, Waldstetten (DE); Ralf Gosnik, Eislingen (DE); Christoph Meyer, Goeppingen (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 0 days.

(21) Appl. No.: 16/356,339

(22) Filed: Mar. 18, 2019

(65) Prior Publication Data

US 2019/0288634 A1  Sep. 19, 2019

(30) Foreign Application Priority Data

Mar. 16, 2018  (DE) .................. 10 2018 002 148

(51) Int. Cl.

| | |
|---|---|
| *H02K 17/32* | (2006.01) |
| *H02P 29/64* | (2016.01) |
| *B23B 39/10* | (2006.01) |
| *B25F 5/00* | (2006.01) |
| *H02P 29/032* | (2016.01) |
| *H02H 7/085* | (2006.01) |

(52) U.S. Cl.
CPC .............. *H02P 29/64* (2016.02); *B23B 39/10* (2013.01); *B25F 5/00* (2013.01); *B25F 5/008* (2013.01); *H02P 29/032* (2016.02); *B23B 2250/12* (2013.01); *B23B 2260/128* (2013.01); *H02H 7/0852* (2013.01)

(58) Field of Classification Search
CPC .................. H02P 29/032; H02P 29/64; G05B 2219/40261
See application file for complete search history.

(56) References Cited

U.S. PATENT DOCUMENTS

| | | |
|---|---|---|
| 4,430,681 A | 2/1984 | Benzing |
| 5,525,878 A | 6/1996 | Buchanan, Jr. et al. |
| 6,172,860 B1 | 1/2001 | Yoshimizu et al. |

(Continued)

FOREIGN PATENT DOCUMENTS

| | | |
|---|---|---|
| DE | 11 07 338 | 5/1961 |
| DE | 3021689 A1 | 12/1981 |

(Continued)

*Primary Examiner* — Karen Masih
(74) *Attorney, Agent, or Firm* — Muncy, Geissler, Olds & Lowe, P.C.

(57) ABSTRACT

A drilling device having a motor for driving a tool received in a tool holder, wherein the motor is coupled to a power source providing electrical operating power, and having a first switch for switching on the motor. A temperature switching element is provided, which is reversibly transferred from a first switching position to a second switching position, which shuts off the motor when the limit temperature of the switched-on motor is exceeded. For cooling the motor, the first switch and the temperature switching element are connected such that in the second switching position of the temperature switching element, it is possible to switch on the motor by pressing and holding the first switch. Moreover, the invention relates to a method for operating a drilling device.

13 Claims, 2 Drawing Sheets

(56) References Cited

U.S. PATENT DOCUMENTS

| | | | |
|---|---|---|---|
| 6,696,814 B2 | 2/2004 | Henderson et al. | |
| 8,933,658 B2 | 1/2015 | Ganev et al. | |
| 2009/0041589 A1* | 2/2009 | Liebert | F04C 28/28 417/32 |
| 2014/0222003 A1* | 8/2014 | Herndon | A61B 5/053 606/80 |

FOREIGN PATENT DOCUMENTS

| | | |
|---|---|---|
| DE | 3422485 A1 | 12/1985 |
| DE | 4119941 A1 | 1/1993 |
| DE | 29701358 U1 | 4/1997 |
| DE | 19844426 A1 | 4/1999 |
| GB | 2283378 A | 5/1995 |
| JP | 2015027711 A | 2/2015 |
| WO | WO 2009/102082 A2 | 8/2009 |

* cited by examiner

DRILLING DEVICE AND METHOD FOR OPERATING A DRILLING DEVICE

This nonprovisional application claims priority under 35 U.S.C. § 119(a) to German Patent Application No. 10 2018 002 148.4, which was filed in Germany on Mar. 16, 2018, and which is herein incorporated by reference.

BACKGROUND OF THE INVENTION

Field of the Invention

The present invention relates to a drilling device, comprising a motor for driving a tool received in a tool holder, wherein the motor is coupled to a power source providing electrical operating power, and comprising a first switch for switching on the motor. Moreover, the invention relates to a method for operating a drilling device according to the invention.

Description of the Background Art

In drilling devices and in particular in core drills, which are used in the drilling of metal but also of rock, it has proven to be problematic that they often produce very high temperatures during operation. This can occur, for example, when the tools used are worn or even damaged. The heating of the drilling device can lead to damage to the drilling device and ultimately even to its failure. Particularly affected is the area of the motor. In the event of overheating, this means that a user of the drilling device must first let the drilling device cool down before work can be continued.

However, this is associated with a considerable amount of time, since it usually takes at least five to ten minutes until the drilling device has cooled down enough that work can be resumed safely.

From the prior art—for example from DE 297 01 358 U1-a drilling device is known in which the motor is separated from the tool by a transmission and operated in an idle mode when the motor temperature exceeds a limit value. For this, however, an extremely complex transmission must be provided in DE 297 01 358 U1, which allows decoupling of the motor from the tool. After decoupling, it is then necessary to wait until the drilling device has cooled sufficiently. Only then is the motor operated for several minutes in the idle mode to achieve cooling of the drilling device. For the user, this means a very long waiting time until the drilling device known from the prior art can again be used.

SUMMARY OF THE INVENTION

It is therefore an object of the present invention to provide an improved drilling device that allows for faster cooling of the drilling device. It is another object of the present invention to provide an improved method of operation.

The object related to the drilling device is achieved according to the invention with a drilling device in that a temperature switching element is provided which is reversibly transferred from a first switching position to a second switching position which shuts off the motor when a limit temperature of the switched-on motor is exceeded, and that for cooling the motor, the first switch and the temperature switching element are connected such that in the second switching position of the temperature switching element, the motor can be switched on by pressing and holding the first switch.

This ensures that the motor of the drilling device is automatically switched off when a limit temperature is exceeded. The temperature switching element thus effectively prevents damage to the drilling device. In particular, in core drills in which a drill stand having a guide is fastened to the workpiece, for example by means of a magnet, the user can initially drive or withdraw the drilling device back slightly into the bore hole. If the user now actuates and holds the first switch, the motor is switched on again, despite the temperature switching element being in the second switching position, namely as long as the first switch remains pressed—i.e., in the form of a "hold-to-run" mode. As a result, the motor and an associated fan is driven and the heat stored in the motor can be effectively dissipated by the rotating motor or by its fan, which in particular prevents heat accumulation within the motor. This makes it possible for the user to reuse the drilling device within a comparatively short period of less than one minute.

In addition, production costs can be lowered in particular if the temperature switching element is designed as a temperature switch. This way, complex electronics that would require permanent monitoring of the motor temperature can be waived. However, it is explicitly provided within the scope of the invention that the temperature of the motor is detected and transferred to a control electronics, which then causes the shutdown of the motor when reaching the limit temperature.

In this context, it has also proven to be particularly advantageous when the temperature switch is electrically connected to a relay connected upstream of the motor. If the first switch is actuated, this will cause the motor to be switched on as long as the temperature switch is in the first switching position. If the temperature of the motor exceeds the limit temperature, the adjustment of the temperature switch from the first switching position into the second switching position induced thereby causes the voltage at the relay connected thereto to drop, as a result of which the motor is automatically switched off. Notwithstanding, in this state, the user is given the opportunity to turn the motor back on to cool it by pressing and holding the first switch.

It has also proven to be advantageous if the temperature switch is designed as a bimetal switch. The use of a bimetal switch has a positive effect on the reliability of the drilling device according to the invention, since such switches are very insensitive to vibrations and shocks. Finally, the use of a bimetal switch also has the advantage that it is inexpensive.

It has proven beneficial when the switching temperature of the temperature switch for its adjustment from the second switching position to the first switching position is smaller than the cut-off temperature for its adjustment from the first switching position to the second switching position. Since the switching temperature is thus smaller than the cut-off temperature, which corresponds to the limit temperature and at which the motor is switched off automatically, it is ensured that switching on the motor by simply pressing and releasing the first switch is only possible when the temperature of the motor has been lowered sufficiently and is below the switching temperature. If, on the other hand, the temperature of the motor has not yet dropped below the switching temperature, releasing the first switch automatically leads to an immediate shutdown of the motor.

In order to prevent abuse by the user, it has also proven successful when a current limiter and/or a torque limiter is provided, with which, when exceeding a preset motor current and/or a preset torque, switching on the motor by pressing and holding the first switch is prevented when the temperature switching element is in the second switching position. This ensures in a simple manner that bypassing motor shutdown above the limit temperature is prevented, which would otherwise lead to irreparable damage to the motor or the entire machine. Thus, the user is unable to continue to use the drilling device for drilling when the temperature of the motor is above the limit temperature, since in this case the current and/or the torque of the running motor would increase above a certain limit during drilling. If this is detected, the function of the first switch is deactivated and the actuation of the first switch no longer switches on the drilling device.

It has also proven to be advantageous if a signal transmitter is provided, which is activated or deactivated when adjusting the temperature switch between the first switching position and the second switching position. This makes it possible for the user to immediately determine whether the temperature of the motor has already exceeded the limit temperature and/or is still below this value. For example, the signal transmitter can be activated below the limit temperature and deactivated above the limit temperature. Alternatively or additionally, it is also provided to activate the signal transmitter only when the temperature of the motor has reached the limit temperature. In this context, it has proven particularly useful when the signal transmitter is selected from a group that includes optical and acoustic signal transmitters. Here, in particular, the optical signal transmitters have proven themselves, which may be formed, for example, as LEDs. These are easy to detect when the noise of the environment is high, as is common on construction sites.

To be able to measure the temperature of the motor as close to the motor as possible, it has also proven to be favorable when the temperature switch is associated with the pole windings of the motor. It has also been found to be advantageous if the temperature switch is glued to the pole windings, wherein other mounting options are also provided in the context of the invention. For example, the temperature switch can be wound directly into the pole windings.

It has also proven to be advantageous if a direction switch is provided for changing the direction of rotation of the motor. This allows the user of the drilling device to change the direction of rotation of the motor—for example, from a clockwise rotation to a counterclockwise rotation—and then cool the drilling device by actuating and holding the first switch. The adjustment of the direction can also be done automatically when the temperature switching element is adjusted between the first and the second switching position.

For the operational reliability of the drilling device according to the invention, it has been found to be advantageous if the limit temperature is between 140° C. and 180° C., and preferably at 160° C. At these temperatures, it is ensured that the drilling device, and in particular the motor, is not exposed to excessive thermal stresses, which could otherwise result in irreparable damage to the motor and/or the drilling device.

The object relating to the method of operation is achieved according to the invention by a method comprising the steps of: actuating a first switch for switching on a motor for driving a tool received in a tool holder; adjusting a temperature switching element, when a limit temperature of the motor is exceeded, from a first switching position to a second switching position that shuts down the motor, and a simultaneous shutdown of the motor; actuating and holding the first switch for switching on the motor, and cooling the motor.

The inventive method ensures that cooling of the motor can be realized in a simple manner in that after adjusting the temperature switch from the first to the second switching position and thereby triggering simultaneous shutdown of the motor by actuating and holding the first switch, said motor is operated in a "hold-to-run" mode and thereby cooled. In other words, it can be said that the overheated motor is cooled by the motor itself.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
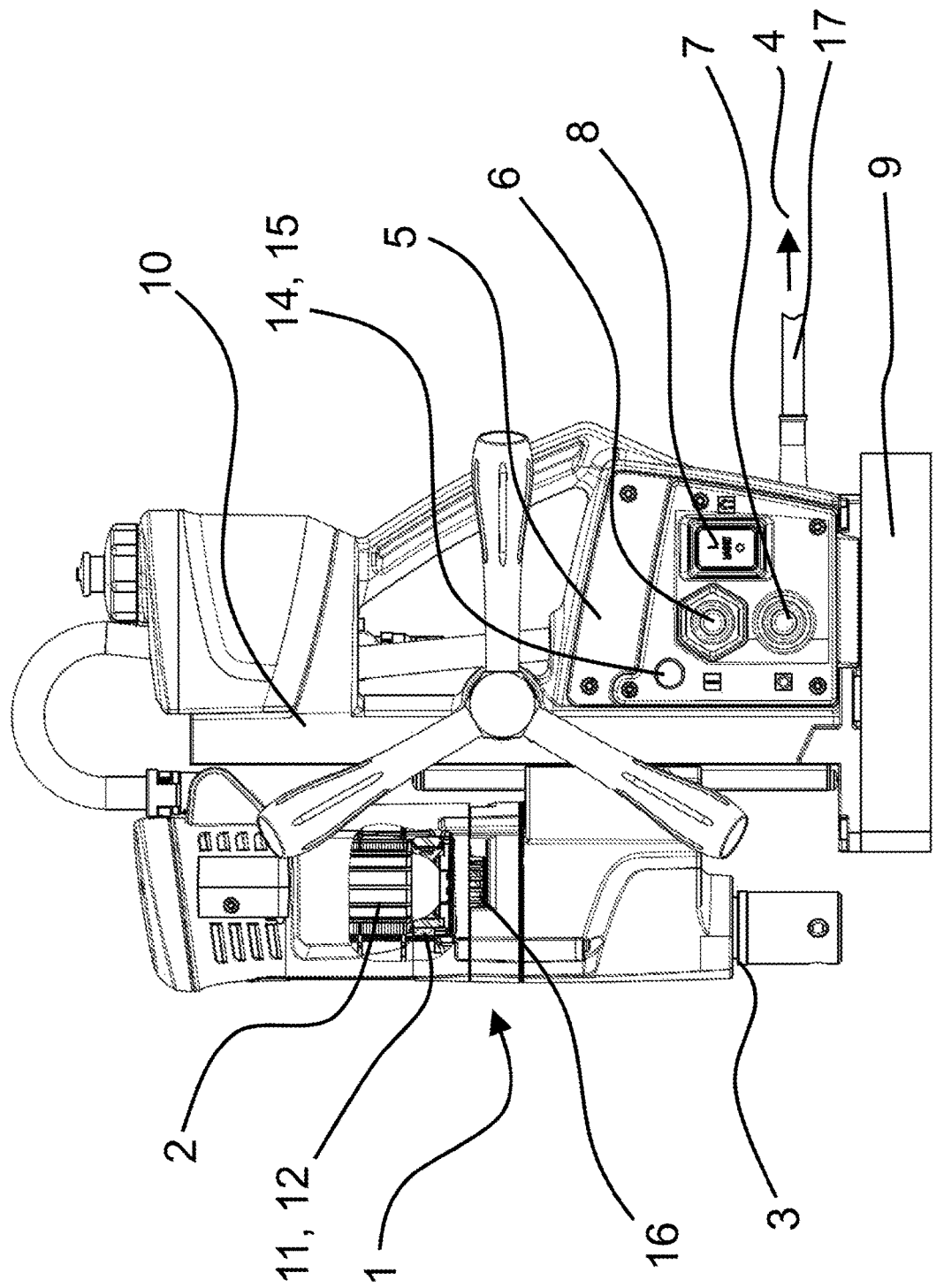
FIG. 1 shows a partially sectioned side view of a drilling device according to the invention.

In a partially sectioned side view, FIG. 1 shows a drilling device 1 with a motor 2 for driving a tool received in a tool holder 3. The drilling device 1 and thus in particular the motor 2 is coupled via a supply cable 17 with a power source 4, indicated in FIG. 1 only as an arrow, providing electrical operating power. In the context of the invention, however, it is also possible to provide the power supply by a battery 15. On a housing 5, a first switch 6 for switching on the motor 2 and a second switch 7 for shutting off the motor 2 are arranged. With a magnetic switch 8, a magnetic base 9 of the drill stand 10 can be turned on to secure the drilling device 1 to a magnetizable subsurface. In order to prevent overheating of the motor 2, a temperature switch 11, which serves as a temperature switching element 12, is attached to the pole windings of the motor 2 by gluing. If the temperature of the switched-on motor 2 exceeds a limit temperature, the temperature switch 11 is reversibly transferred from a first switching position to a second switching position, which shuts off the motor 2. For cooling the overheated motor 2, the first switch 6 can be actuated and held, whereby the motor 2 is switched on and cooled by the movement of the motor 2 and a fan 16 connected thereto. In the drilling device 1 shown in the drawing, which is a core drill, the temperature switch 11 is electroconductively connected to a relay 13 upstream of the motor 2, as will be explained in more detail in particular with reference to FIG. 2. Furthermore, a signal transmitter 14 can be seen in FIG. 1, which is designed in the embodiment shown as an optical signal transmitter as an LED 15. When adjusting the temperature switching element 12 between the first switching position and the second switching position, this LED is activated, i.e., when the temperature of the motor 2 exceeds the limit temperature. In the embodiment shown, said temperature is at 160° C.

Figure 2:
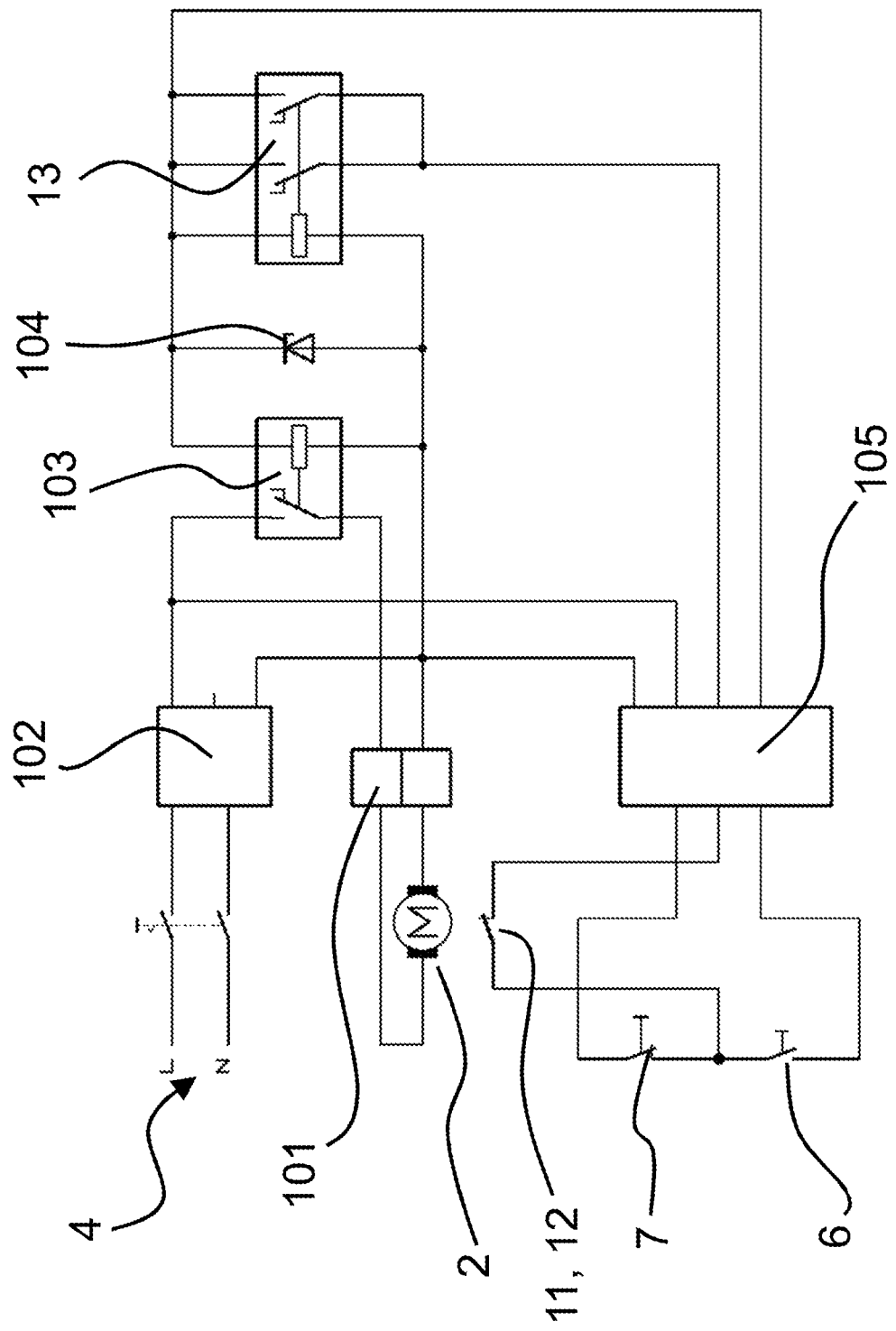
FIG. 2 shows a simplified block diagram of a drilling device according to the invention.

FIG. 2 shows a minimized circuit diagram of the drilling device 1 according to the invention. From this it can be seen that the temperature switch 11 is coupled to the motor 2 via the relay 13. If the temperature of the motor 2 exceeds the limit temperature, the temperature switch 11 is opened, whereby a voltage drop occurs at the relay 13, which causes the voltage supply of the motor 2 to be interrupted. For the user, however, it is then possible, to start the motor 2 in a "hold-to-run" mode by pressing and holding the first switch 6, i.e., ultimately, to bridge the opened temperature switch 11. If the user then releases the first switch 6, this will cause the motor 2 to be shut off again if the latter has a temperature which is above a switching temperature of the temperature switch 11. This switching temperature is less than a cut-off temperature corresponding to the limit temperature. If, on the other hand, the temperature of the motor 2 has dropped below the switching temperature by pressing the first switch 6, which is signaled to the user by the extinguishing of the LED 15, then releasing the first switch 6 causes the motor 2 to run. The temperature switch 11 is then again in the first switching position i.e., in the closed state, allowing the relay 13 to switch and ensuring the power supply of the motor 2 via the power source 4. A contact 101 for the motor 2 can also be seen in the circuit diagram. In order to comply with the requirements for electromagnetic compatibility, a radio interference filter 102 is provided. The switching on and off of the motor 2 is controlled by a motor relay 103. The voltage is limited by means of a freewheeling diode 104 when relay 13 and motor relay 103 are switched off. The magnetic base 9 as well as the relay 13 and the motor relay 103 are supplied with voltage by control electronics 105, which include a bridge rectifier and varistor.

The method according to the invention will be described again below. The user of the drilling device 1 according to the invention first actuates the first switch 6 for switching on the motor 2, whereby the tool received in the tool holder 3 of the drilling device 1 begins to rotate. If the temperature of the motor 2 exceeds the limit temperature during the drilling operation, the temperature switching element 12, which is formed in the embodiment shown as a temperature switch 11, is transferred from a first switching position to a second switching position, in which the motor 2 is shut off. However, it is now possible for the user to switch on the motor 2 in a "hold-to-run" mode by actuating and holding the first switch 6. Hereby, the heat contained in the motor 2 is dissipated by the fan 16 therein. If the temperature of the motor 2 has been lowered below a switching temperature by the operation of the drilling device 1 in the "hold-to-run" mode 20, the temperature switch 11 is transferred from the second switching position to the first switching position, so that releasing the first switch 6 causes the drilling device 1 to remain switched on. If, on the other hand, the temperature of the motor 2 has not yet dropped below the switching temperature, then releasing the second switch 6 causes the motor 2 to be shut off again, since then the temperature switch 11 is still in the second switching position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drilling device comprising:
   a motor for driving a tool received in a tool holder, the motor being coupled to a power source providing electrical operating power;
   a first switch for switching on the motor; and
   a temperature switching element, which, when a limit temperature of the switched-on motor is exceeded, is reversibly transferred from a first switching position to a second switching position which shuts off the motor, and for cooling the motor, the first switch and the temperature switching element are connected such that in the second switching position of the temperature switching element, the motor is switched on by pressing and holding the first switch, the cooling of the motor continuing while the first switch remains pressed and held down.

2. The drilling device according to claim 1, wherein the temperature switching element is a temperature switch.

3. The drilling device according to claim 2, wherein the temperature switch is electroconductively connected with a relay connected upstream of the motor.

4. The drilling device according to claim 2, wherein the temperature switch is a bimetal switch.

5. The drilling device according to claim 1, wherein a signal transmitter is provided which is activated and/or deactivated during the adjustment of the temperature switching element between the first switching position and the second switching position.

6. The drilling device according to claim 5, wherein the signal transmitter is an optical or acoustic signal transmitter.

7. The drilling device according to claim 2, wherein the temperature switch is associated with pole windings of the motor.

8. The drilling device according to claim 1, wherein a direction switch is provided for changing the direction of rotation of the motor.

9. The drilling device according to claim 1, wherein the limit temperature is between 140° C. and 180° C., or is 160° C.

10. A method of operating a drilling device according to claim 1, the method comprising:
    actuating the first switch for switching on the motor for driving a tool received in the tool holder of the drilling device;
    adjusting the temperature switching element, when the limit temperature of the motor is exceeded, from the first switching position to the second switching position that shuts off the motor, and a simultaneous shutdown of the motor;
    actuating and holding the first switch for switching on the motor to cool the motor when the temperature switching element is in the second switching position; and
    cooling the motor while the first switch remains actuated and held down.

11. The method according to claim 10, wherein the temperature switching element is a temperature switch, and wherein a switching temperature of the temperature switch for an adjustment from the second switching position to the first switching position is smaller than the limit temperature for the adjustment from the first switching position to the second switching position.

12. A drilling device comprising:
    a motor for driving a tool received in a tool holder, the motor being coupled to a power source providing electrical operating power;
    a first switch for switching on the motor; and
    a temperature switching element, which, when a limit temperature of the switched-on motor is exceeded, is reversibly transferred from a first switching position to a second switching position which shuts off the motor, and for cooling the motor, the first switch and the temperature switching element are connected such that in the second switching position of the temperature switching element, the motor is switched on by pressing and holding the first switch wherein the temperature switching element is a temperature switch, and wherein a switching temperature of the temperature switch for an adjustment from the second switching position to the first switching position is smaller than the limit temperature for the adjustment from the first switching position to the second switching position.

13. A drilling device comprising:

a motor for driving a tool received in a tool holder, the motor being coupled to a power source providing electrical operating power;

a first switch for switching on the motor; and a temperature switching element, which, when a limit temperature of the switched-on motor is exceeded, is reversibly transferred from a first switching position to a second switching position which shuts off the motor, and for cooling the motor, the first switch and the temperature switching element are connected such that in the second switching position of the temperature switching element, the motor is switched on by pressing and holding the first switch, wherein a current limiter and/or a torque limiter is provided, with which, when exceeding a preset motor current and/or a preset torque, switching on the motor by actuation of the first switch is prevented when the temperature switching element is in the second switching position.

* * * * *